(12) United States Patent
Simon et al.

(10) Patent No.: US 12,519,633 B2
(45) Date of Patent: Jan. 6, 2026

(54) KEY REVOCATION FOR EDGE DEVICES

(71) Applicant: Analog Devices, Inc., Wilmington, MA (US)

(72) Inventors: Jonathan Noah Simon, Castro Valley, CA (US); Tze Lei Poo, Cambridge, MA (US)

(73) Assignee: Analog Devices, Inc.

( * ) Notice: Subject to any disclaimer, the term of this patent is extended or adjusted under 35 U.S.C. 154(b) by 204 days.

(21) Appl. No.: 17/548,431

(22) Filed: Dec. 10, 2021

(65) Prior Publication Data

US 2022/0209946 A1  Jun. 30, 2022

Related U.S. Application Data

(60) Provisional application No. 63/132,992, filed on Dec. 31, 2020.

(51) Int. Cl.
| | |
|---|---|
| *H04L 9/08* | (2006.01) |
| *G06F 21/57* | (2013.01) |
| *H04L 9/32* | (2006.01) |
| *H04L 9/40* | (2022.01) |
| *H04W 12/04* | (2021.01) |

(52) U.S. Cl.
CPC ............ *H04L 9/0891* (2013.01); *G06F 21/57* (2013.01); *H04L 9/3247* (2013.01); *H04L 63/123* (2013.01); *H04W 12/04* (2013.01)

(58) Field of Classification Search
None
See application file for complete search history.

(56) References Cited

U.S. PATENT DOCUMENTS

| | | | |
|---|---|---|---|
| 7,437,551 B2 | 10/2008 | Chan et al. | |
| 8,131,646 B2 | 3/2012 | Kocher et al. | |
| RE43,934 E | 1/2013 | Smith | |
| 8,484,451 B2 | 7/2013 | Sibert et al. | |

(Continued)

FOREIGN PATENT DOCUMENTS

| | | |
|---|---|---|
| CN | 110168552 | 8/2019 |
| JP | 2008-017462 | 1/2008 |

(Continued)

OTHER PUBLICATIONS

PCT/US2021/062879, Mar. 30, 2022, International Search Report and Written Opinion.

(Continued)

*Primary Examiner* — Benjamin E Lanier
(74) *Attorney, Agent, or Firm* — DLA Piper LLP (US)

(57) ABSTRACT

Described herein are techniques of remotely performing key revocation on a device that cannot communicate outside of a local network of the device. The techniques involve including key revocation instructions in software update instructions that are sent to the device. The device may verify the software update instructions using one or more keys to determine whether they are safe for execution on the device. For example, the device may verify that the software update instructions have been sent by a trusted software provider. The device may execute the key revocation instructions included in the software update instruction to revoke use of a key of the key(s), and initiate use of a new key in place of the revoked key.

16 Claims, 9 Drawing Sheets

(56) References Cited

U.S. PATENT DOCUMENTS

| | | | |
|---|---|---|---|
| 9,118,486 | B2 | 8/2015 | Pritikin |
| 9,372,813 | B2 | 6/2016 | Kapil et al. |
| 9,471,910 | B2 * | 10/2016 | Racz .................. H04L 67/34 |
| 9,479,332 | B2 | 10/2016 | Ballesteros |
| 9,800,669 | B2 | 10/2017 | Bell |
| 9,892,584 | B1 | 2/2018 | Saylor |
| 9,900,152 | B2 | 2/2018 | Allen |
| 9,973,484 | B2 | 5/2018 | Reid et al. |
| 9,973,485 | B2 | 5/2018 | Keidar |
| 10,181,956 | B2 | 1/2019 | Jeansonne et al. |
| 10,237,249 | B2 | 3/2019 | Campagna et al. |
| 10,686,827 | B2 | 6/2020 | Schutz |
| 2006/0143473 | A1 | 6/2006 | Kumar |
| 2009/0172419 | A1 | 7/2009 | Takayama |
| 2009/0232310 | A1 | 9/2009 | Holtmanns et al. |
| 2014/0006804 | A1 * | 1/2014 | Tkacik ............... G06F 9/45558 713/192 |
| 2015/0019856 | A1 * | 1/2015 | Kim ................... G06F 21/575 713/1 |
| 2017/0017354 | A1 * | 1/2017 | Wei .......................... G06F 8/34 |
| 2017/0155514 | A1 * | 6/2017 | Schulz .................. G06F 21/57 |
| 2017/0359171 | A1 | 12/2017 | Haridas et al. |
| 2018/0198629 | A1 * | 7/2018 | Deymonnaz .......... H04L 9/0894 |
| 2019/0163912 | A1 | 5/2019 | Kumar et al. |
| 2019/0349190 | A1 | 11/2019 | Smith et al. |
| 2021/0036851 | A1 | 2/2021 | Villapakkam et al. |
| 2021/0064509 | A1 * | 3/2021 | Franke ................ G06F 11/3664 |
| 2021/0385070 | A1 * | 12/2021 | Watson ................ H04L 63/062 |

FOREIGN PATENT DOCUMENTS

| | | |
|---|---|---|
| KR | 101346777 B1 | 1/2014 |
| WO | 2015/004831 | 1/2015 |

OTHER PUBLICATIONS

International Search Report and Written Opinion mailed Mar. 30, 2022 in connection with International Application No. PCT/US2021/062879.

[No Author Listed], Digital cellular telecommunications system (Phase 2+) (GSM); Universal Mobile Telecommunications System (UMTS); LTE; 5G; Generic Authentication Architecture (GAA); Generic Bootstrapping Architecture (GSA). ETSI Technical Specification, Nov. 9, 2020. 3GPP TS 133.220 version 16.2.0 Release 16. 96 pages. [last retrieved Nov. 19, 2020].

[No Author Listed], Digitally Signed Cisco Software. Cisco Systems, Inc. Oct. 2, 2009. 22 pages. [last updated Apr. 21, 2021.].

[No Author Listed], IoT Security Guidelines Endpoint Ecosystem. GSM Association, Official Document; v2.2, Feb. 29, 2020; 80 pages.

Ge et al., Survey on Key Revocation Mechanisms in Wireless Sensor Networks. Journal of Network and Computer Applications. Mar. 1, 2016;63:24-38.

Johnson et al., Intel® Software Guard Extensions: EPID Provisioning and Attestation Services. Intel Corp. White Paper. Mar. 9, 2016;1(1-10):119.

Menezes et al., Key Management Techniques ED. In: Handbook of Applied Cryptography 1997. CRC Press Series on Discrete Mathematics and Its Applications. Oct. 1996; Chapter 13: 543-590. 49 pages.

International Preliminary Report on Patentability mailed Jul. 13, 2023 in connection with International Application No. PCT/US2021/062879.

Office Action for Japanese Application No. 2023-540166, dated Jun. 10, 2025, 6 pages.

Office Action for Japanese Patent Application No. 2023-540166, mailed Oct. 21, 2025, 5 pages.

* cited by examiner

KEY REVOCATION FOR EDGE DEVICES

RELATED APPLICATIONS

This application claims the benefit under 35 U.S.C. § 119(e) of U.S. Provisional Application No. 63/132,992 entitled "KEY REVOCATION FOR EDGE DEVICES," filed Dec. 31, 2020, which is incorporated by reference herein in its entirety.

FIELD

Embodiments described herein relate to remotely performing key revocation on a device that is limited to communication within a local network of the device.

BACKGROUND

A device may use a key to perform cryptographic operations such as encrypting and/or decrypting data. A key used by a device may need to be removed from operation. For example, a device may need to stop using one key for encryption and/or decryption and replace the key with a new key. The device may perform a process of key revocation to revoke use of one key and initiate use of a new key in place of the revoked key.

BRIEF SUMMARY

Described herein are techniques of remotely performing key revocation on a device that cannot communicate outside of a local network of the device. The techniques involve including key revocation instructions in software update instructions that are sent to the device. The device may verify the software update instructions using one or more keys to determine whether they are safe for execution on the device. For example, the device may verify that the software update instructions have been sent by a trusted software provider. The device may execute the key revocation instructions included in the software update instruction to revoke use of a key of the key(s), and initiate use of a new key in place of the revoked key.

In some embodiments, the device may verify software update instructions using multiple keys, each associated with a different party. For example, one key may be used to verify a signature of a software provider while another key may be used to verify a signature of a user of the device. The device may be configured to execute revocation instructions included in the software update instructions when the software update instructions are verified using both keys. The use of multiple keys provides an additional layer of security against improper key revocation being performed by the device, as an adversary would need to access two separate keys from two different parties in order to initiate a key revocation.

According to some embodiments, a method for performing a key revocation on a device limited to communication within a local network of the device is provided. The device stores a first key and a second key. The method comprises: using a processor of the device to perform: receiving, from a host system within the local network of the device, instructions for updating software installed on the device, wherein the instructions include instructions for revocation of the first key; and executing the instructions, wherein execution of the instructions causes the device to: revoke use of the first key; and initiate use of a third key in place of the first key.

According to some embodiments, a device forming part of a local network and limited to communication within the local network is provided. The device comprises: a wireless communication circuit; memory configured to store a first key and a second key; and a processor configured to: receive, using the wireless communication circuit from a host system within the local network, instructions for updating software installed on the device, wherein the instructions include instructions for revocation of the first key; and execute the instructions, wherein execution of the instructions causes the device to: revoke use of the first key; and initiate use of a third key in place of the first key.

A system for performing key revocation on a device without having connectivity to the device. The device has a first key. The system comprises: a wireless communication circuit; and a processor configured to: transmit, to a host system within a local network of the device, instructions for updating software installed on the device, wherein the instructions, when executed by the device, cause the device to: revoke use of the first key of the device; and initiate use of a second key in place of the first key.

A device limited to communication within a local network of the device. The device comprising: a wireless communication circuit; a memory configured to store a first key; and a processor configured to: receive, using the wireless communication circuit from a host system within the local network, instructions for updating software installed on the device, wherein the instructions include instructions for revocation of the first key; verifying the instructions using the first key; and after verifying the instructions using the key, executing the instructions, wherein execution of the instructions causes the device to: revoke use of the first key; and initiate use of a second key in place of the first key.

DETAILED DESCRIPTION

Figure 1:
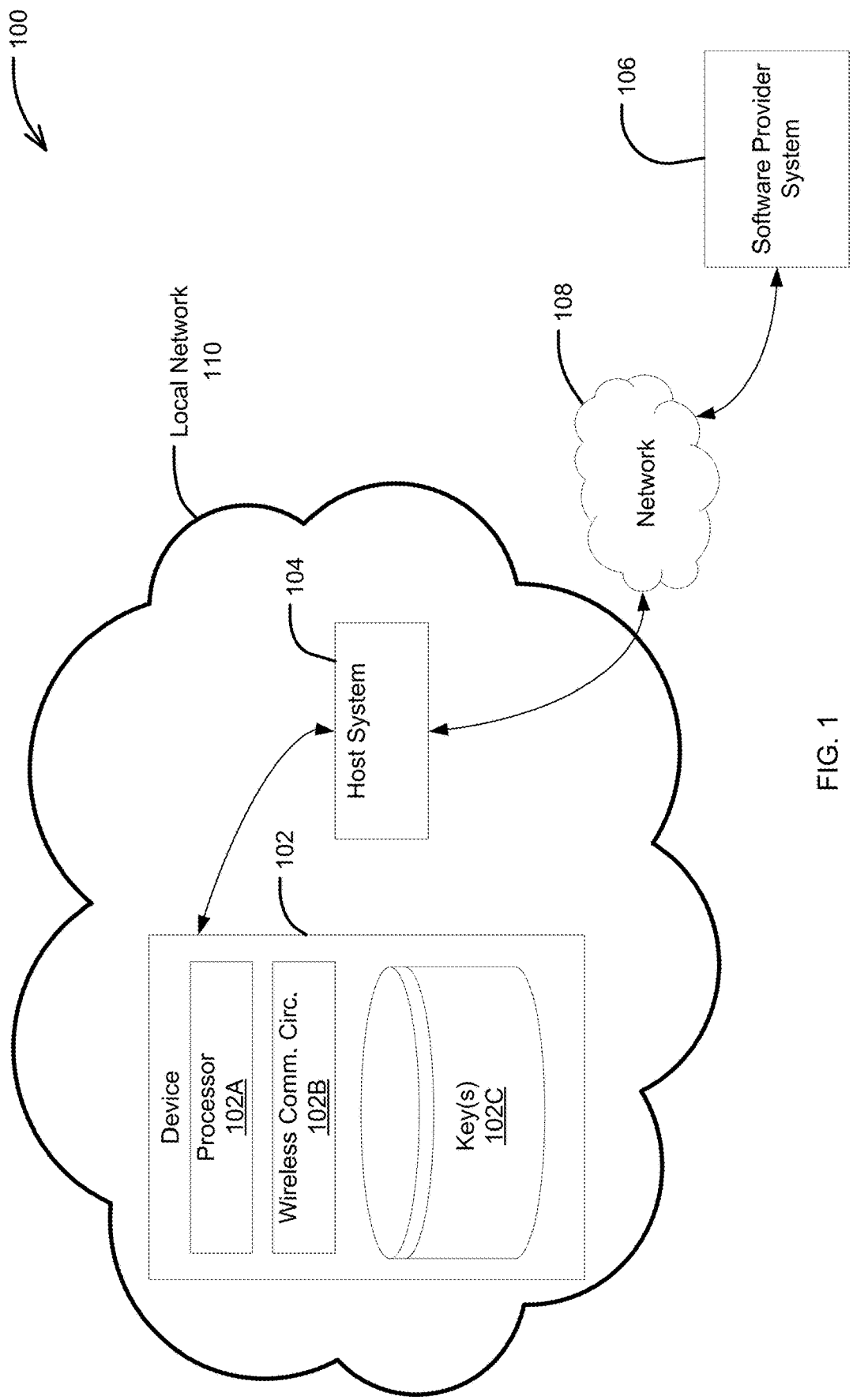
FIG. 1 illustrates an example system in which some embodiments of the technology described herein may be implemented.

Certain computing devices—sometimes referred to as "edge devices"—are unable to communicate outside of a local network, and thus rely on a host system to communicate outside of the local network. For example, an edge device may rely on a host system that is located proximate the edge device to communicate with a system over the Internet. A system without access to the local network ("external system") or physical access to the edge device is limited to communicating with the edge device through the host system. As an illustrative example, the edge device may be a battery monitoring device that is sealed inside a battery back. The battery monitoring device may monitor conditions of the battery while the battery is installed and used in a product (e.g., an automobile). While the battery monitoring device is deployed on the product, the battery monitoring device may be unable to communicate over the Internet, and thus a manufacturer's computer system may be limited to communicating with the battery monitoring device (e.g., to retrieve monitoring data) through a host system that is proximate the battery monitoring device.

An edge device may store one or more keys for use in performing cryptographic operations. The cryptographic operations may include encrypting data and/or decrypting data. For example, the edge device may use a key to decrypt data of a digital signature to verify the digital signature. As another example, the edge device may use a key to encrypt data as a digital signature of the device. An edge device may also use key(s) to verify software installed on the device. Software installed on the edge device may have been digitally signed using key(s) by one or more external systems such as a software provider's system, a system of a user of the edge device, and/or another external system. The edge device may store key(s) corresponding to the key(s) used to digitally sign the software, and use its stored key(s) to verify that the software is from a trusted source, for example from the software provider. As an illustrative example, a device may store public key(s) corresponding to private key(s) that were used to digitally sign software installed on the device. In this example, the device may use its stored public key(s) to verify digital signature(s) of the software before allowing the software to operate the device.

Throughout the lifetime of an edge device, it may be desirable or even necessary to perform key revocation in which usage of a key by the edge device is stopped ("revoked") and usage of a new key is initiated. For example, if a private key stored on a software provider's computer system is compromised, a corresponding key on a device may need to be revoked in order to protect the device from being susceptible to receiving unauthorized communications from the manufacturer's computer system. For example, an adversarial entity may use the compromised private key to transmit software to the device, and possibly gain unauthorized control of the device. Without revocation of the key corresponding to the private key, the device would be unable to detect that the software provided by the adversarial entity is unauthorized for use. The problem may be further compounded because the edge device may be one of many edge devices that each uses the key to verify software on the device. The key may thus be stored on a fleet of a user's devices. Without revocation of the key from the fleet of devices, an adversarial entity may gain unauthorized control over the entire fleet of devices. As an illustrative example, each of a fleet of vehicle sensors may store a public key corresponding to a private key of a provider of software installed on the sensor, and use the key to verify the software when it is being loaded before allowing it to control the sensor. If an adversary were to gain access to the private key of the software provider, the adversary may be able to transmit its own software to the vehicle sensors signed using the private key. As the vehicle sensors would still be using the key corresponding to the private key, the vehicle sensors would load the adversary's software and allow it to control the sensors.

The inventors have recognized that performing remote key revocation on an edge device is difficult because of the limitations in communicating with the edge device. A system (e.g., a software provider system) that needs to initiate a key revocation cannot directly communicate with the edge device to do so. Instead, key revocation on an edge device would be initiated by an intermediary host system that can communicate with the edge device (e.g., over a local network). However, an edge device that receives a key revocation instruction from a host system cannot verify that the key revocation request is valid because the edge device cannot communicate with a third party verification authority to verify the validity of the request. For example, the edge device cannot access an independent third party certification authority through the Internet to verify that a key revocation request was generated by a trusted software provider system. The edge device would be unaware if the host system that transmitted the request has been compromised, or that a key revocation request received from the host system was initiated by an adversarial entity. Conventional techniques do not allow secure performance of remote key revocation on an edge device without a third party verification authority.

The inventors have developed techniques to securely perform remote key revocation on an edge device without requiring a third party verification authority. The techniques provide a remote key revocation process that does not rely on a host system to initiate remote key revocation. This prevents a compromised host system or compromised system communicating with the host system from performing unauthorized key revocation on the edge device. The techniques leverage a secure software update process to perform key revocation.

Some embodiments of techniques described herein use a secure software update procedure to perform key revocation on a device that is limited to communication within a local network of the device. The techniques embed software instructions for performing key revocation within software update instructions provided to the device. When the device receives the software update instructions, the device may verify and execute the software instructions and, as a result, revoke use of a key and initiate use of a new key in place of the revoked key. The techniques limit initiation of key revocation on the edge device to the secure software update procedure used to update software on the edge device, and thus do not allow the host system to initiate key revocation. In some embodiments, the local network of the device lacks any third party verification authority that the device can use to verify instructions received by the device. Thus, the device may be unable to communicate any such third party verification authority. By embedding key revocation instructions in the software update instructions, some embodiments eliminate the need for the device to participate in communication (e.g., in a challenge response protocol) to request key revocation. This eliminates the opportunity for an adversary to provide its own new key to use in place of a revoked key by intercepting a request to perform key revocation transmitted by the device. Instead, the device verifies software update instructions provided to the device using one or more of its keys. The key revocation is performed if the software update instructions are verified, and otherwise not executed.

Some embodiments of techniques described herein perform remote key revocation using a trusted software platform of the edge device. The trusted software platform may allow the device to perform key revocation even if a key of the device is compromised. The trusted software platform of the device uses two keys, each provided by a separate party, to verify software loaded on the device. The trusted software platform includes multiple software layers which are serially loaded. The software layers may include one or more trusted bootloaders that verify the software using the two keys before enabling the software to operate the device.

Accordingly, techniques described herein improve the security of an edge device by allowing key revocation to be performed in a secure manner. Due to an edge device's inability to communicate with a third party verification authority, conventional techniques would either require the edge device to execute revocation instructions without verification that the instructions are sent by a trusted source (e.g., a device manufacturer and/or a provider of software installed on the device), or otherwise not include key revocation functionality in the edge device and thus be susceptible to an adversary that gains access to a key corresponding to a key of the device (e.g., an adversary that acquires a private key corresponding to a public key stored on the device). Techniques described herein provide a more secure edge device that includes key revocation functionality for protection against communication from a compromised external system, and the ability to verify that key revocation instructions are from a trusted source.

Some embodiments may allow one-time revocation, in which the edge device stores a flag indicating whether a key has been revoked. Some embodiments may allow a predetermined number of key revocations, in which the edge device selects from a set of keys during each revocation. Some embodiments may allow an unlimited number of revocations, where each revocation updates a key. Some embodiments of techniques described herein include a key selection mechanism that indicates to the edge device to stop using one key, and initiate use of another key. The secure key mechanism may use a flag indicating that a key is revoked, and an indication of a new key.

FIG. 1 illustrates an example system 100 in which some embodiments of the technology described herein may be implemented. The system 100 includes a device 102 and a host system 104 within a local network 110, and a software provider system 106 in communication with the host system 104 through a network 108. The device 102 is an edge device. As illustrated in FIG. 1, the device 102 is limited to communication with devices within the local network 110 of the device. The device 102 is unable to communicate with the software provider system 106 through the network 108, or otherwise directly with the software provider system 106.

The network 108 may be any suitable communication network through which the software provider system 106 may communicate with the host system 104. In some embodiments, the network 108 may include one or more vehicle networks. For example, the network 108 may include a controller area network (CAN) through which the software provider system 106 may communicate with the host system 106. The network 108 may include an electronic control unit (ECU) that communicates with the host system 104 and the software provider system 106 through the CAN. In some embodiments, the network 108 may include local area network (LAN). In some embodiments, the network 108 may include a remote network (e.g., the Internet). In some embodiments, the network 108 may be a local connection between the software provider system 106 and the host system 104.

The device 102 includes various components. As shown in FIG. 1, the device 102 includes a processor 102A, wireless communication circuitry 102B, and memory 102C. In some embodiments, the device 102 may include a system on chip (SoC) that includes the processor 102A, the wireless communication circuitry 102B, and the memory 102C.

The processor 102A comprises electronic circuitry configured to execute software instructions. For example, the processor 102A may comprise a microcontroller, a microprocessor, an embedded processor, a digital signal processor (DSP), a graphical processing unit (GPU), a neural processing unit (NPU), and/or another suitable processor.

The processor 102A may be configured to perform key revocation. The processor 102A may perform revocation by executing software instructions stored on the device 102 (e.g., in memory 102C). The processor 102A may be configured to perform key revocation by receiving from the host system 104 within the local network 110 of the device 102, instructions for updating software installed on the device 110. The instructions for updating software installed on the device 110 may include software instructions for an update to software installed on the device. For example, the software instructions may include an updated software image for a software application installed on the device. The instructions may further include instructions for revocation of a key (e.g., stored in memory 102C). When the processor 102A executes the key revocation instructions, they cause the device 102 to revoke use of one key and initiate use of another key in place of the revoked key. In some embodiments, the revocation instructions, when executed by the processor 102A, may cause the processor 102A to access the new key from memory 102C of the device 102, and configure the device 102 to use the new key in subsequent operations in place of the first key. For example, the revocation instructions may cause the processor 102A to access the new key from flash memory of the device 102. In some embodiments, the revocation instructions may include the new key. In such embodiments, the processor 102A may copy the new key from the revocation instructions into its memory 102C, and use the new key in subsequent operations in place of the first key.

As an illustrative example, the device 102 may be a vehicle controller device having software installed thereon for electronically controlling a vehicle (e.g., climate system control, cruise control, auto-driving, braking, and/or another aspect of the vehicle). The host system 104 may be a central electronic control unit (ECU) of the vehicle through which the device 102 receives software updates. In this example, the vehicle controller device may receive an update to its control software which also includes key revocation instructions. For example, the vehicle controller device may receive an update including the key revocation instructions due to a breach of the software provider system 106 in which an adversary gained access to a private key corresponding to a previous key of the device 102. As such the adversary could transmit its own software instructions to the device 102 signed with the private key. As the vehicle controller device does not have access to a third party verification authority (e.g., through the Internet), the vehicle controller device would be unable to determine that the software instructions were transmitted by an adversary.

Returning again to FIG. 1, the wireless communication circuitry 102B may comprise a transceiver that allows the device 102 to communicate with one or more external systems (e.g., host system 104) within a range of the device 102. For example, the transceiver may be a BLUETOOTH transceiver, an infrared (IR) transceiver, a radio transceiver, or other suitable type of transceiver. The wireless communication circuitry 102B may be configured to communicate in a local network (e.g., network 110) of the device 102. The device 102 may use the wireless communication circuitry 102B to transmit and/or receive data from an external system. For example, the device 102 may use the wireless communication circuitry 102B to transmit and receive data in packets. In some embodiments, the wireless communication circuitry may be limited to communication within the local network 110 of the device 102. The local network 110 may have a boundary that is within a vicinity of the wireless communication circuitry 102B. For example, the wireless communication circuitry 102B may be limited to communicating with external systems within a threshold distance of the wireless communication circuitry 102B. The threshold distance may be 10 feet, 20 feet, 30 feet, 40 feet, 50 feet, 100 feet, 200 feet, or other suitable distance from the wireless communication circuitry 102B. In some embodiments, the local network 110 may be a wireless local network (WLAN), For example, the WLAN may include a router configured to transmit and receive data over radio frequencies. In some embodiments, the local network 110 may be a communication network between the wireless communication circuitry 102B and one or more external systems.

Memory 102C may comprise hardware that can be configured to store information. For example, the memory 102C may comprise an integrated circuit that is used to store information. The memory 102C may include non-volatile memory such as flash memory, one time programmable (OTP) memory, read-only memory (ROM), programmable read-only memory (PROM), erasable programmable read-only memory (EPROM), and/or electrically erasable programmable read-only memory (EEPROM). The memory 102C may include volatile memory such as static random access memory (SRAM) and/or dynamic random access memory (DRAM).

As shown in FIG. 1, the memory 102C is configured to store one or more keys. The key(s) may be cryptographic key(s) that are used to perform cryptographic operations including authentication of data, encryption of data, decryption of data, generation and/or verification of a signature, verification of software instructions, and/or other cryptographic operations. In some embodiments, a key may consist of a set of characters. For example, the key may be a randomly generated string of characters. In some embodiments, a key may be generated using a key generation algorithm. For example, a key may be generated using a deterministic random bit generator (DRBG), or a pseudo-random number generator (PRNG) to obtain a random value. In some embodiments, a key may be generated from a random value using a key generation algorithm. In another example, the key may be generated from a random value using a key generation algorithm such as the advanced encryption standard (AES) key generation algorithm, or the Rivest Shamir Adleman (RSA) key generation algorithm. In some embodiments, the key(s) may include asymmetric key(s). The asymmetric key(s) stored in the memory 102C may be public key(s) corresponding to private key(s). In some embodiments, the key(s) may include symmetric key(s). The symmetric key(s) stored in the memory 102C may be identical to key(s) stored in another system.

In some embodiments, the key(s) may include multiple keys generated by multiple external systems. Each of the multiple keys may be generated by a respective external system. In some embodiments, a first key may be generated by a software provider system 106 and a second key may be generated by a system associated with a user of the device 102. A system associated with a user of the device 102 may also be referred to herein as a "user system". To illustrate, the software provider system 106 may be associated with a manufacturer of the device. When the device 102 is with the manufacturer, the manufacturer may use the software provider system 106 to generate a key (e.g., a symmetric key, or a public key) that is then stored in the memory 102C. A user of the device 102 (e.g., an entity that purchases the device 102) may use a user system to generate a key (e.g., a symmetric key, or a public key) that is stored in the memory 102C.

In some embodiments, the key(s) may include a single key generated by an external system. In some embodiments, the key may be generated by a software provider system 106. For example, the software provider system 106 may generate the key and store the key in the memory 102C while the device 102 is with the manufacturer. In some embodiments, the key may be generated by a user system. For example, the key may be generated by a user system and stored in the memory 102C of the device 102 prior to deployment of the device 102.

In some embodiments, the key(s) may include one or more keys to use after revocation. A key that is be used after performing a revocation may also be referred to herein as "revocation key". For example, the key(s) may include a first key that the device is configured to use for cryptographic operations, and a revocation key that the device is configured to use after revocation of the first key. When revocation is performed by the device, the device may stop use of the first key and initiate use of the revocation key for performing cryptographic operations. In some embodiments, the key(s) may include multiple revocation keys. In such embodiments, each time the device 102 performs revocation, the device 102 may revoke use of a previous key and initiate use of one of the multiple revocation keys. For example, the key(s) may include 2, 3, 4, 5, or more revocation keys. In some embodiments, the key(s) may include a single revocation key. In such embodiments, the device 102 may be limited to performing one revocation. In some embodiments, revocation key(s) may be stored in the memory 102C prior to deployment of the device 102 for use. For example, the revocation key(s) may be stored in the memory 102C during manufacturing of the device 102. In another example, the revocation key(s) may be stored in the memory 102C by a user of the device prior to deploying the device 102 for use. In some embodiments, the amount of storage space in the memory 102C may limit the number of keys that can be stored therein. For example, the amount of storage space in the memory 102C may limit the number of keys to 2, 3, 4, or 5 keys.

Figure 2:
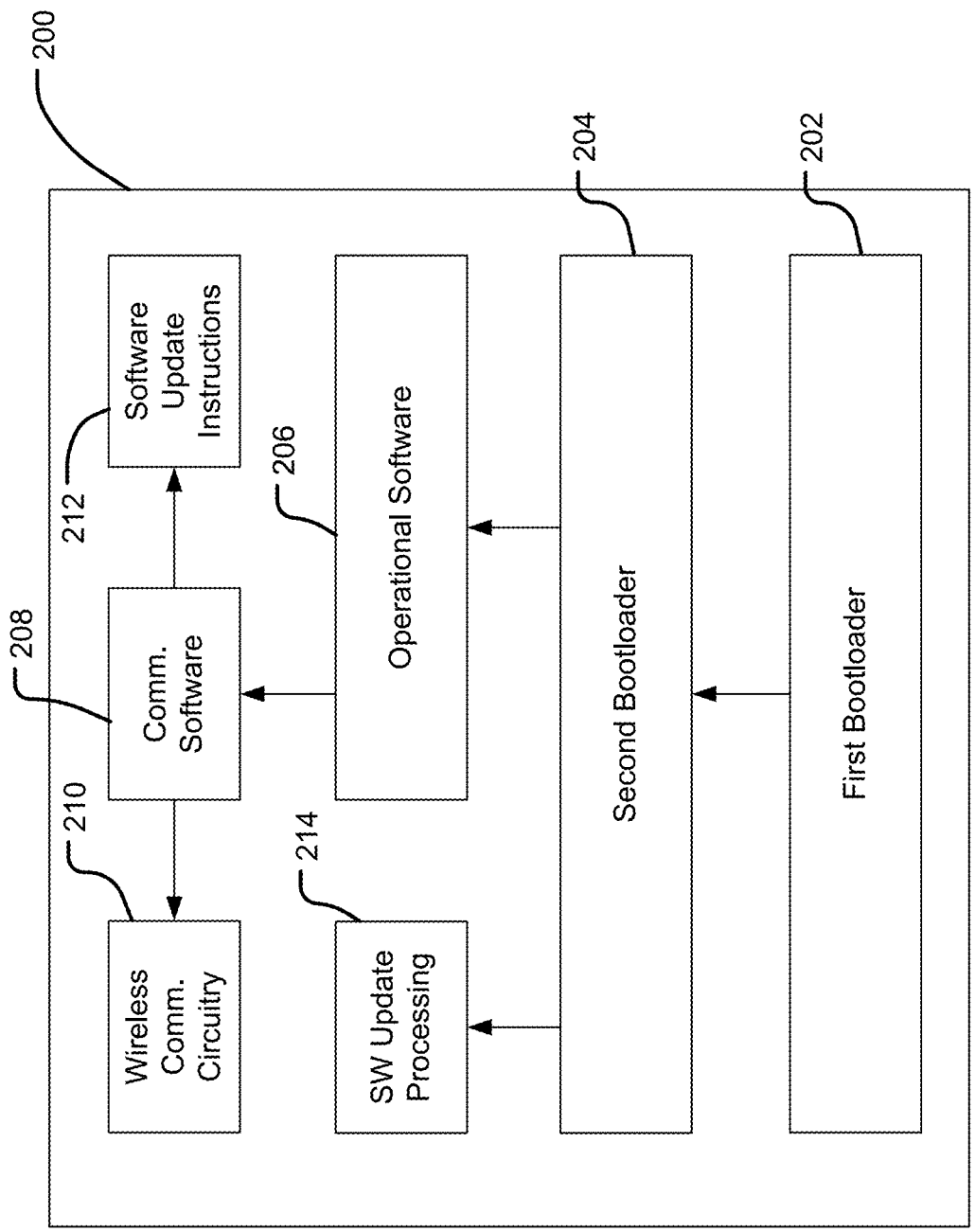
FIG. 2 illustrates an example software architecture of a device, according to some embodiments of the technology described herein.

FIG. 2 illustrates an example software architecture 200 of the device 102, according to some embodiments of the technology described herein. As shown in FIG. 2, the software architecture 200 includes a first bootloader 202, a second bootloader 204, operational software 206, communication software 208, and over-the-air (OTA) processing software 214. In some embodiments, the first bootloader 202 may be an immutable hardware bootloader (e.g., in ROM), and the second bootloader 204 may be an optional subsequent bootloader that performs additional validation. In some embodiments, the second bootloader 204 may be stored in flash memory.

The device 102 may be configured to use the first bootloader 202 and the second bootloader 204 when loading operational software 206 onto the device 102. Each of the bootloaders 202, 204 may comprise a set of instructions stored in memory 102C of the device 102 that are executed to load the operational software 206 into memory of the device 102. For example, the first bootloader 202 may be stored in read-only memory (ROM) and the second bootloader 204 may be stored in flash memory. The device 102 may be configured to use the bootloaders 202, 204 to sequentially load the operational software 206 in stages. In some embodiments, each of the bootloaders 202, 204 may be configured to use its own respective key to verify the operational software 206. For example, the first bootloader 202 may use a first key to verify a first signature of the operational software 206, and the second bootloader 204 may use a second key to verify a second signature of the operational software 206. The first signature may be generated by a software provider system and a second signature may be generated by a user system. In embodiments in which each of the first bootloader 202 and the second bootloader 204 is configured to use its own respective key to verify the operational software 206, for an adversary to load operational software onto the device 102, the adversary would have to transmit software to the device 102 that includes two separate signatures generated using two separate keys of two different parties (e.g., software provider and user).

As illustrated in FIG. 2 the operational software 206 may use communication software 208 to operate wireless communication circuitry 210 of the device. The wireless communication circuitry 210 may be the wireless communication circuitry 102B described herein with reference to FIG. 1. The communication software 208 may allow the device 102 to transmit and receive data from the host system 104. The communication software 208 may be configured to receive, using the wireless communication circuitry 210, software update instructions 212 from the host system 104. The software update instructions may include key revocation instructions. As shown in FIG. 2, the software update instructions processing 214 is performed by the second bootloader 204. The software update instructions processing 214 is performed by the second bootloader because the software update may include updates to the bootloaders 202, 204. In some embodiments, the operational software 206 may be restricted from modifying the bootloaders 202, 204. Restricting the operational software 206 from modifying the bootloaders 202, 204 may ensure that the bootloaders 202, 204 are protected from any adversary, and thus can be trusted to update software on the device 102. In such embodiments, software updates may not be performed by operational software 206.

Although the example embodiment of FIG. 2 includes two bootloaders, in some embodiments, the software architecture of a device may include one bootloader. The bootloader may be configured to perform the processing of the bootloaders 202, 204 described herein. In some embodiments, the bootloader may be an immutable hardware bootloader. For example, the immutable hardware bootloader may be a ROM bootloader. In some embodiments, the software architecture may include one or more subsequent optional bootloaders that may be configured to perform additional validation. In such embodiments, the optional bootloader(s) may not be required to load operational software onto the device, or to verify software instructions (e.g., including key revocation instructions).

The host system 104 may comprise one or more computing devices within a local network 110. The host system 104 may be located within a vicinity of the device 102 in which the device 102 can communicate with the host system (e.g., using wireless communication circuitry 102B). The host system 104 may be configured to communicate through a network 108 that is outside of the local network 110 of the device. As shown in FIG. 1, the host system 104 can communicate with a software provider system 106 through the network 108. For example, the host system 104 may include wireless communication circuitry that allows the host system 104 to communicate through the Internet. As an illustrative example, the host system 104 may be a central electronic control unit (ECU) of a vehicle, while the device 102 may be a vehicle controller device for a particular component of the vehicle (e.g., climate control, cruise control, auto driving, and/or braking).

The software provider system 106 may comprise one or more computing devices outside of the local network 110 of the device 102. In some embodiments, the software provider system 106 may be associated with a manufacturer of the device 102. The software provider system 106 may provide software for operation of the device 102. For example, the device 102 may be a vehicle controller device, and the software provider system 106 may provide a software application for the device 102 to perform its vehicle control operations. In another example, the device 102 may be a sensor, and the software provider system 106 may provide a software application that operates the sensor to collect measurements. In another example, the device 102 may be a camera and the software provider system 106 may provide software instructions for performing image processing and enhancement that are used by the camera in capturing images.

The software provider system 106 may be configured to remotely perform key revocation on the device 102. The software provider system 106 may be configured to remotely revoke a key on the device 102 by generating software update instructions that include key revocation instructions. The software provider system 106 may transmit the software update instructions to the host system 104 through the network 108 for transmission to the device 102. In some embodiments, the software provider system 106 may be configured to: (1) generate the software update instructions to include an update to software installed on the device 102 and key revocation instructions; and (2) and include authentication information with the generated set of software instructions. In some embodiments, the authentication information may be a digital signature. In some embodiments, the authentication information may be an authentication code generated using a symmetric algorithm. In some embodiments, the authentication information may be an encrypted hash of the software update instructions encrypted by the software provider system 106. An update to software installed on the device 102 may be a software image, and the key revocation instructions may include software instructions that, when executed by a processor of the device 102, cause the device to stop use of a key and initiate use of a new key for cryptographic operations in place of the revoked key. A key that is presently used by the device 102 to verify information and instructions sent by the software provider system 106 may be used to verify the software update instructions. For example, the software provider system 106 may digitally sign the software update instructions using a private key corresponding to a public key stored by the device 102. In another example, the software provider system 106 may digitally sign the software update instructions using a symmetric key that is also stored by the device 102. In some embodiments, the software provider system 106 may be configured to sign a software update using a new key (e.g., a new private key) such that the device 102 can verify the software update using a corresponding new key (e.g., new public key) that is to be used as a result of executing the revocation instructions. The device 102 may be configured to use its new key to verify the updated software (e.g., when loading the software onto the device 102).

Figure 3:
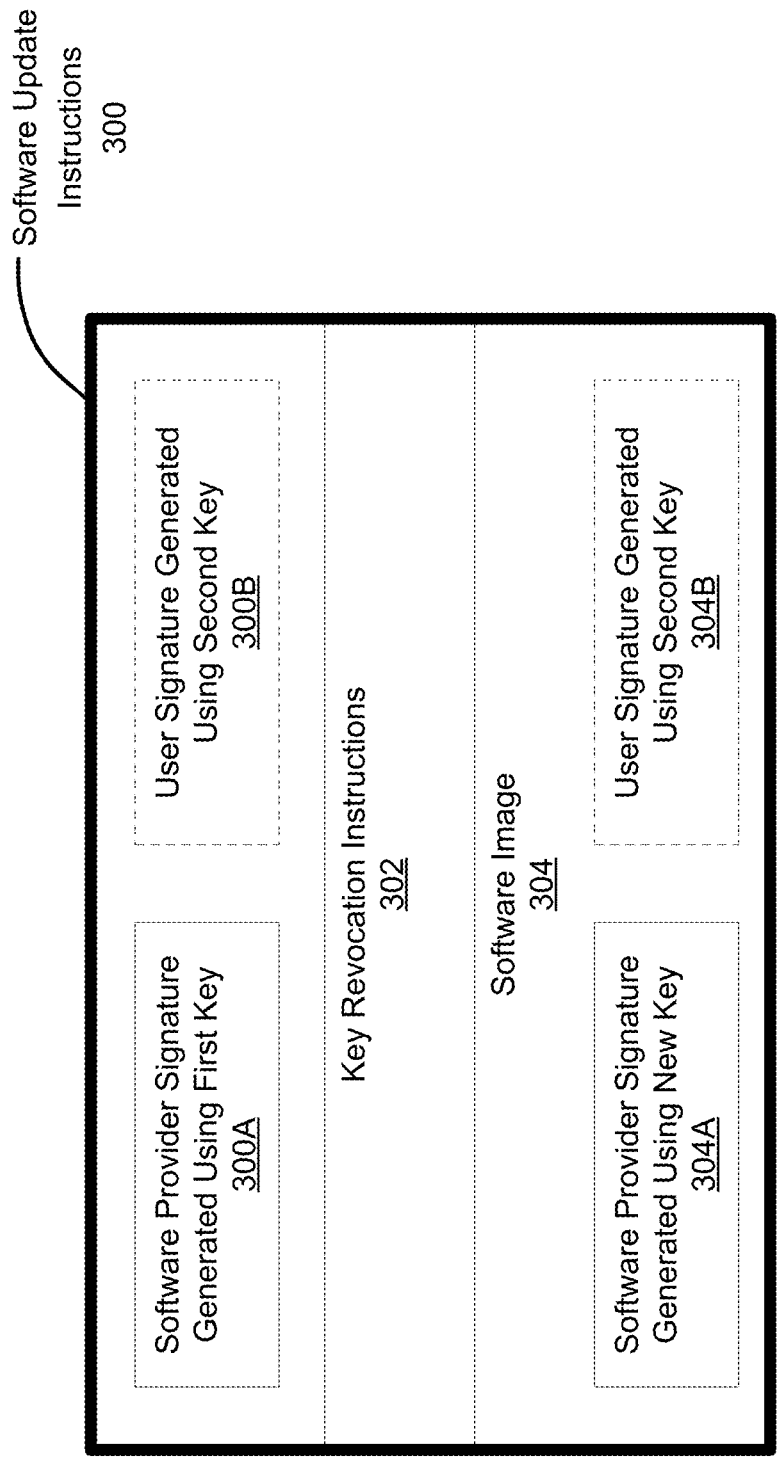
FIG. 3 illustrates an example set of software update instructions, according to some embodiments of the technology described herein.

FIG. 3 illustrates an example set of software update instructions 300, according to some embodiments of the technology described herein. The software update instructions 300 may be generated by the software provider system 106 of FIG. 1.

The software update instructions 300 include a set of key revocation instructions 302. The key revocation instructions 302 may be executable by a processor of the device 102. When executed, the key revocation instructions 302 may cause the device 102 to stop use of a first key for cryptographic operations and initiate use of new key for subsequent cryptographic operations. For example, the key revocation instructions 302 may cause the processor to update a flag associated with the first key stored in memory indicating that the first key is no longer to be used and/or update a flag associated with new key in memory indicating that the new key is to be used. In another example, the key revocation instructions 302 may cause the device 102 to remove the first key from the memory 102C of the device. In another example, the key revocation instructions 302 may identify a location in memory of the device 102 storing the new key from which the device 102 is to obtain a key for use in cryptographic operations. In another example, the revocation instructions 302 may modify a variable in memory 102C of the device 102 that causes the device 102 to use the new key in place of the first key. The software update instructions 300 include a software image 304. The software image 304 may be an updated software image for software installed on the device. For example, the software image 304 may update operations performed by the device 102, resolve bugs in software of the device 102, or otherwise modify the software of the device 102.

The software update instructions 300 of FIG. 3 are signed with two signatures: a first signature 300A generated by the software provider system 106 using a first key, and a second signature 300B generated by a user system using a second key. The device 102 may be configured to verify the software update instructions 300 using both signatures (e.g., as performed in process 600 described herein with reference to FIG. 6). In this embodiment, for an adversary to be able to transmit a software image and/or key revocation instructions to the device 102, the adversary would have to access both the first key and the second key in order to generate the two signatures. As indicated by the dotted line around the signature 300B generated using the second key, in some embodiments, the software update instructions 300 may only be signed with the signature 300A generated using the first key. In such embodiments, the software update instructions 300 may be signed by the software provider system 106 but not a user system.

As illustrated in FIG. 3, the software image 302 is signed with a signature 304A generated using the new key that is to be used after the device 102 executes the key revocation instructions 302. The device 102 may verify the new software image 304 using the new key. For example, the device 102 may verify the new software image 304 using the new key when loading the software after power up. The software image 304 is also signed with a signature 304B generated using the second key (e.g., of a user system). The device 102 may use the signature 304B to verify the software image 304 in addition to the signature 304A generated using the new key. In some instances, the new software image 304 may be functionally identical to the to a software image that is presently on the device. In such instances, the new software image 304 may be provided to provide the new key and/or the signature 304B. Thus, the software update instructions 300 may be used to perform key revocation without updating functionality of the software.

As indicated by the dotted lines of the signature 304B, in some embodiments, the software image 304 may be signed with the signature 304A without the signature 304B. For example, the user system may not sign the software image 304. In another example, the user system may sign the software update instructions 300, but the software provider system may not. In some embodiments the software update instructions 100 are signed by one entity (e.g., a software provider system or a user system), and delivered (e.g., to a host system) by another entity (e.g., the user system or the software provider system) that does not sign the software update instructions 100. For example, the software provider system may sign the software instructions 300, and the user system may deliver the software update instructions 300 to the host system. In such embodiments, an adversary would still need to access two separate systems (i.e., the signing system and the delivery system) to gain access to be able to provide key revocation instructions to a device.

Figure 4A:
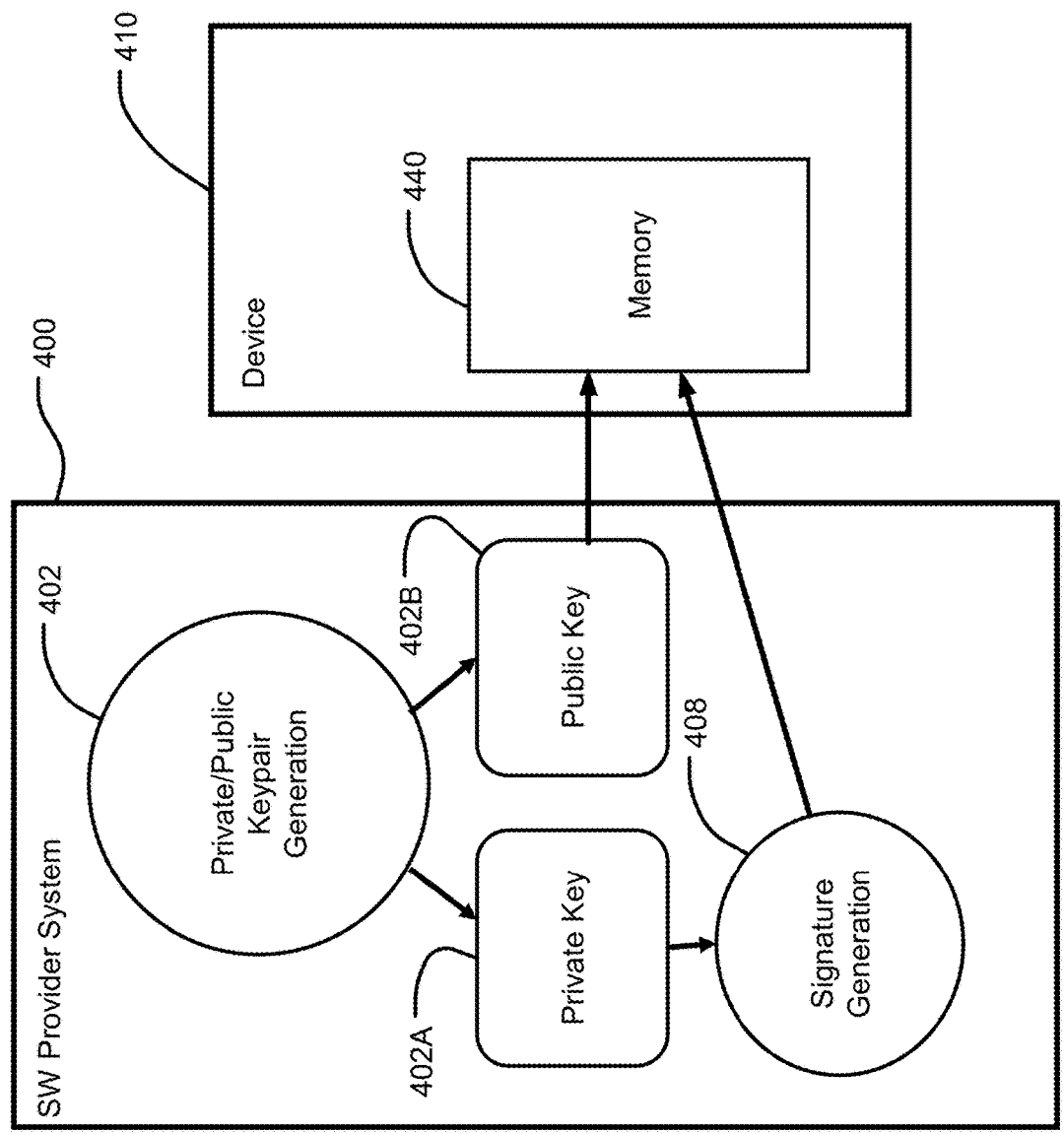
FIG. 4A illustrates a software provider system placing a first key on a device, according to some embodiments of the technology described herein.

FIG. 4A illustrates a software provider system 400 placing a first key on a device 410, according to some embodiments of the technology described herein. In some embodiments, the software provider system 400 may be software provider 106 of FIG. 1 and the device 410 may be device 102 of FIG. 1.

The software provider system 400 performs key generation 402. In the example of FIG. 4A, the software provider system 400 performs private/public keypair generation in which the software provider system 400 generates a keypair consisting of a private key 402A and a corresponding public key 402B. The private key 402A may not be shared outside of the software provider system 400, while the corresponding public key 402B may be distributed outside of the software provider system 400. In some embodiments, the software provider system 400 may be configured to use key generation 402 to generate an asymmetric key pair for a signature algorithm. For example, the software provider system 400 may generate an asymmetric key pair for a Rivest-Shamir Adleman (RSA), Elliptic Curve Digital Signature Algorithm (ECDSA), digital signature algorithm (DSA), or other digital signature scheme. In another example, the software provider system 400 may perform key generation 402 to generate a symmetric key.

The software provider system 400 transmits the public key 402B and signature to the device 410. As shown in FIG. 4A, the software provider system 400 transmits the public key 402B and/or signature to the device 410 for storage in memory 440 of the device 410. In some embodiments, the software provider system 400 may transmit the public key 402B to the device 410 through a physical connection. For example, the software provider system 400 may be connected to the device 410 using a Joint Test Action Group (JTAG) connection, serial peripheral interface (SPI), an I2C connection, a low pint count (LPC) interface, a universal serial bus (USB) connection, an ethernet connection, a firewire connection, a serial port connection, or other suitable physical connection. In some embodiments, the software provider system 400 may transmit the public key 402B to the device 410 through a wireless connection. For example, the software provider system 400 may be connected to the device 410 using BLUETOOTH, infrared, Wi-Fi, or other suitable wireless connection. In some embodiments, the software provider system 400 may be configured to transmit the public key 402B to the device 410 during manufacturing. The software provider system 400 may be associated with a manufacturer of the device 410. Prior to sending the device 410 to a user, the software provider system 400 may transmit the public key 402B to the device 410.

As shown in FIG. 4A, the software provider system 400 further performs signature generation 408 using the private key 402A to generate a signature. The software provider system 400 transmits a generated signature to the device 410 for storage in memory 440. The public key 402B corresponding to the private key 402A used to generate the signature may subsequently be used by a user system to verify that the signature loaded in the memory 440 of the device 410 is a valid signature of a software provider. In some embodiments, the software provider system 400 may be configured to generate the signature by encrypting data using the private key 402A to obtain encrypted data. The public key 402B stored in the memory 440 of the device 410 may be used by a user system to verify that the signature stored in the device 410 is valid (e.g., using an RSA, ECDSA, or other suitable digital signature scheme).

Although in the example of FIG. 4A, the software provider system 400 generates a private/public keypair, in some embodiments, the software provider system 400 may be configured to generate a symmetric key. In such embodiments, the system 400 may generate a single key that is transmitted to the device 410 to store in memory 440. The software provider system 400 may use the same key to encrypt a message authentication tag. The user system may use the key verify that the message authentication tag has not changed.

Figure 4B:
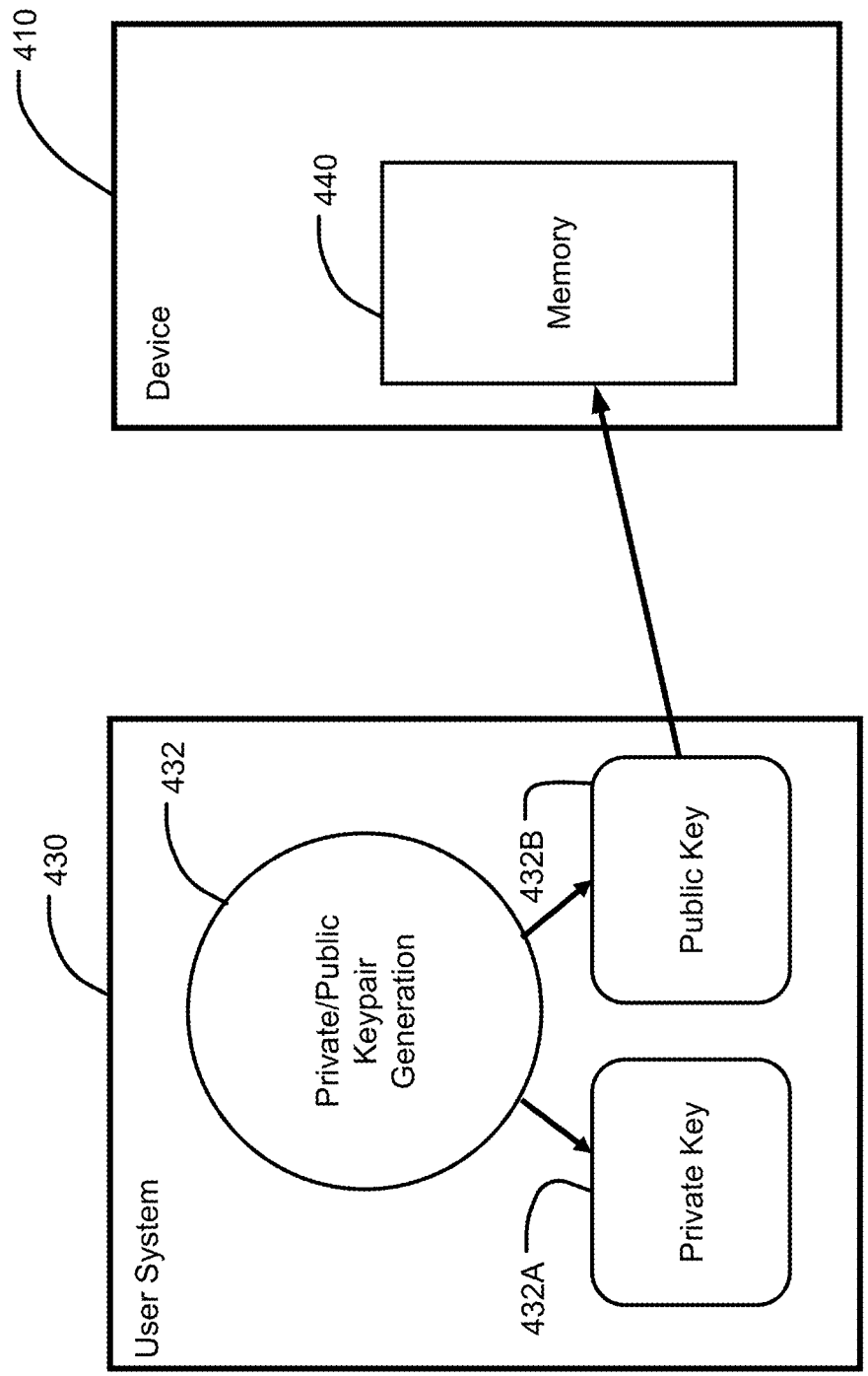
FIG. 4B illustrates a system associated with a user of the device of FIG. 2A placing a second key on the device, according to some embodiments of the technology described herein.

FIG. 4B illustrates a user system 430 associated with a user of the device 410 of FIG. 2A placing a second key on the device 410, according to some embodiments of the technology described herein. In the example of FIG. 4B, the user system 430 performs private/public keypair generation 432 in which the user system 430 generates a keypair consisting of a private key 432A and a corresponding public key 432B. The private key 432A may not be shared outside of the user system 430, while the corresponding public key 432B may be distributed outside of the user system 430. In some embodiments, the user system 430 may be configured to perform key generation 432 to obtain an asymmetric key pair for a signature algorithm. Example algorithms are described herein with reference to FIG. 4A. In some embodiments, the user system 430 may be configured to perform key generation 432 to generate a symmetric key.

As shown in FIG. 4A, the user system 430 transmits the public key 432B to the device 410 for storage in memory 440 of the device 410. In some embodiments, the user system 430 may be configured to transmit the public key 402B to the device 410 through a physical connection. For example, the user system 430 may transmit the public key 432B to the device 410 through a universal serial bus (USB) connection, an ethernet connection, a firewire connection, a serial port connection, or other suitable physical connection. In some embodiments, the user system 430 may be configured to transmit the public key 402B to the device 410 through a wireless connection. For example, the user system 430 may transmit the public key 432B to the device 410 using a BLUETOOTH connection, infrared connection, Wi-Fi connection, or other suitable wireless connection. In some embodiments, the user system 430 may be configured to transmit the public key 432B to the device 410 prior to deployment. For example, the device 410 may be obtained from a manufacturer. The user system 430 may transmit the public key 432B to the device 410 after the device 410 is obtained from the manufacturer. The user system 430 may further be configured to verify a public of a software provider system stored in the memory 440 of the device 410 as described herein with reference to FIG. 4A.

Although in the example of FIG. 4B, the user system 430 generates a private/public keypair, in some embodiments, the user system 430 may be configured to generate a symmetric key. In such embodiments, the system 430 may be configured to generate a single key that is transmitted to the device 410 to store in memory 440.

Figure 5:
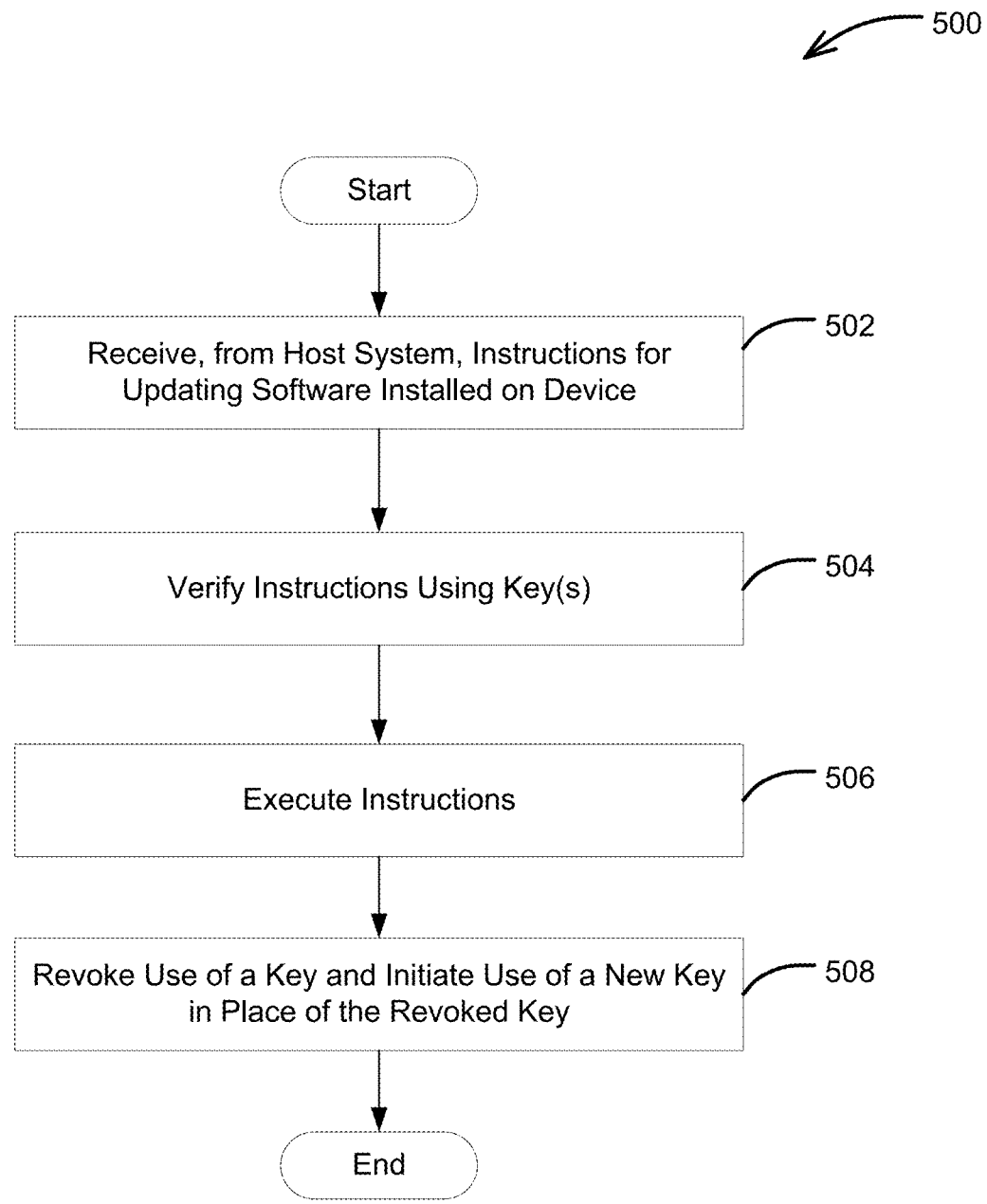
FIG. 5 illustrates an example process for a device to perform key revocation, according to some embodiments of the technology described herein.

FIG. 5 illustrates an example process 500 for a device to perform key revocation, according to some embodiments of the technology described herein. The process 500 may be performed by device 102 described herein with reference to FIG. 2. In some embodiments, the process 500 may allow the device to perform key revocation without having to request key revocation from another system. For example, the process 500 may be performed without the device communicating a request to perform key revocation to a system.

Process 500 begins at block 502, where the device receives, from a host system (e.g., host system 104 described herein with reference to FIG. 1), instructions for updating software installed on the device. An example set of instructions are described herein with reference to FIG. 3. The instructions may have been provided to the host system from a software provider system (e.g., software provider system 106). The device may be configured to receive the instructions for updating the software through a connection with the host system within a local network of the device. In some embodiments, the device may receive the instructions for updating software installed on the device through a physical connection with the host system. For example, the device may be embedded in a vehicle and the host system may be an ECU of the vehicle that is connected to the device through a wired connection. In some embodiments, the device may receive the instructions for updating software installed on the device through a wireless connection. For example, the device may be able to communicate wirelessly with the host system in a local network of the device.

Next, process 500 proceeds to block 504, where the device verifies the instructions received at block 502 using one or more keys. The device may be configured to use a key to verify that the instructions have been received from a trusted source. For example, the device may use the key to verify that the instructions are instructions generated by a software provider system (e.g., of a manufacturer of the device). In some embodiments, the device may be configured to use the key to verify the instructions. For example, the device may use the key to verify a digital signature included in the instructions using a digital signature scheme (e.g., RSA, ECDSA, or other digital signature scheme). In this example, the verification may involve: (1) performing an operation using the key; and (2) verifying the digital signature based on the result of the operation. The device may verify the digital signature based on the result of the operation by determining whether the result matches an expected result. In another example, the device may verify a message authentication tag using the key (e.g., where the key is a symmetric key).

In some embodiments, the device may be configured to verify the instructions using multiple keys. The multiple keys may have been stored on the device prior to deployment of the device for use. For example, the device may verify the instructions using a key stored on the device by a software provider (e.g., a device manufacturer) and a key stored on the device by a user of the device. The keys may have been stored on the device as described herein with reference to FIGS. 4A-4B. Process 600 describes an example process that the device may perform to verify the instruction using multiple keys.

Next, process 500 proceeds to block 506, where the device executes the instructions. A processor of the device may be configured to execute the instructions. In some embodiments, the device may be configured to execute the instructions using bootloader(s) of the device. For example, the device may execute the instructions using bootloader(s) as described with respect to reference 214 of FIG. 2.

Next, process 500 proceeds to block 508, where the device revokes use of a first key and initiates use of a new key in place of the first key. The device may perform the steps of block 508 as a result of executing the instructions at block 506. The instructions cause the device to perform revocation. In some embodiments, the device may set a flag that causes the device to revoke use of the first key and initiate use of the new key stored in memory of the device. For example, the flag may activate a software function that, when executed, causes the device to revoke use of the first key and initiate use of the new key. In some embodiments, the instructions may include the new key and the device may replace the first key with the new key included in the instructions. In some embodiments, the device may read the new key from the device's memory, and replace the first key with the new key. In some embodiments, the device may modify a flag associated with the first key to indicate that the first key is no longer to be used (e.g., in performing verification, encryption, and/or other processes). In some embodiments, the device may update an index whose value indicates a respective one of a plurality of keys stored in memory of the device. The updated index may indicate the new key in place of the first key. For example, the device may update the index by incrementing the index. In another example, the device may update the index by randomly setting the index to a value different from its current value.

In some embodiments, the device may revoke use of data associated with the first key as part of revoking the first key. The data may be used by the device in conjunction with the first key to perform verification. In some embodiments, the data may be a hashing of a set of data that is used to verify a digital signature. For example, the device may compare a decryption of a digital signature obtained using the first key to the data (e.g., the hashing of the set of data) to verify the digital signature. The device may revoke use of the of the data associated with the first key, and initiate use of new data associated with the new key. The device may replace the data associated with the first key with the new data associated with the new key, or otherwise update an indication (e.g., an index or flag) that causes the device to subsequently use the new data with the new key.

Figure 6:
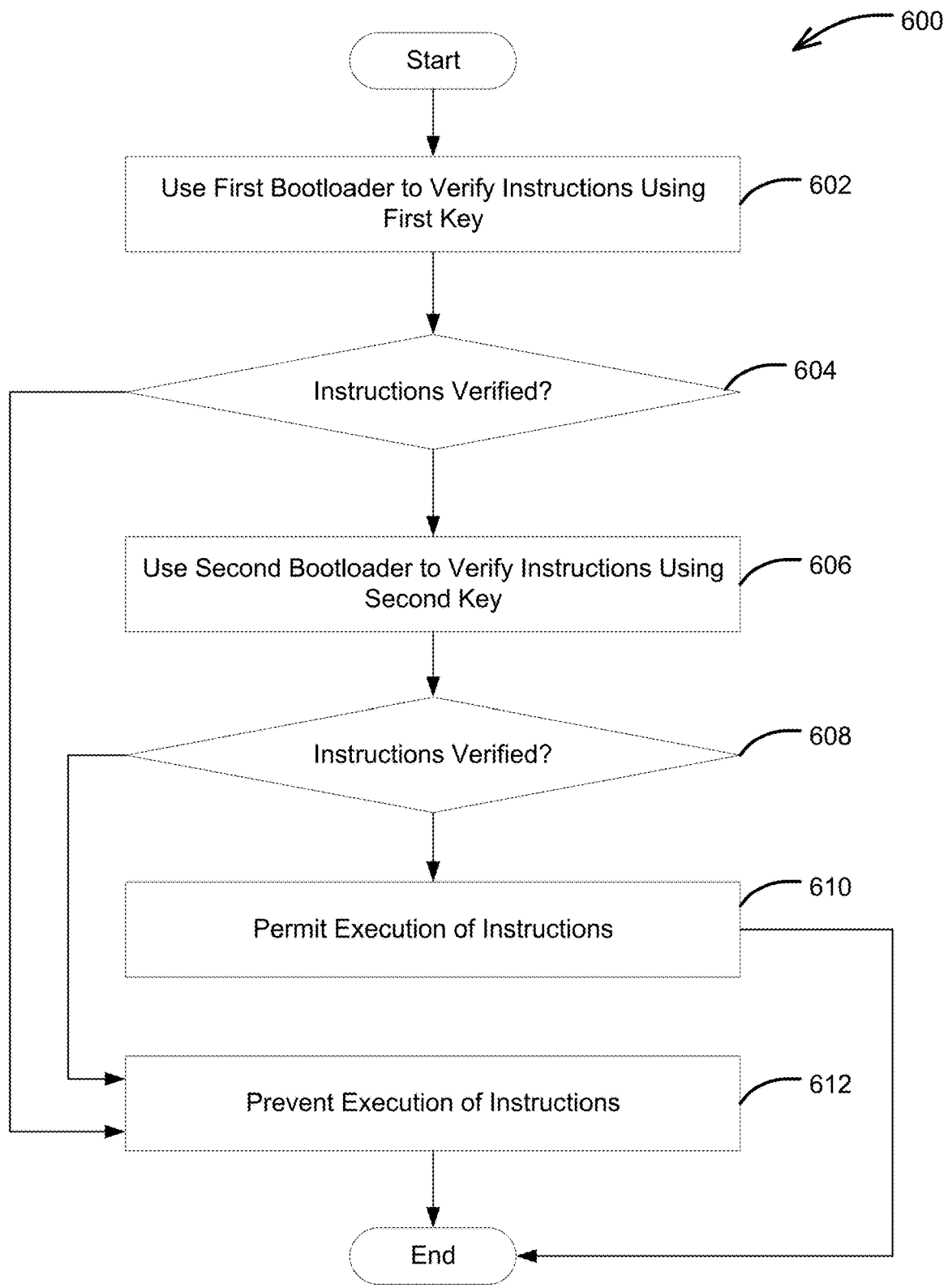
FIG. 6 illustrates an example process of verifying software update instructions, according to some embodiments of the technology described herein.

FIG. 6 illustrates an example process 600 of verifying software update instructions, according to some embodiments of the technology described herein. Process 600 may be performed by device 102 described herein with reference to FIG. 1. In some embodiments, process 600 may be performed as part of block 508 of process 500 described herein with reference to FIG. 5. In some embodiments, process 600 may also be performed by a device at every boot up to verify software installed prior to loading the software.

The device performing process 600 may be configured with a multi-bootloader software architecture (e.g., as described herein with reference to FIG. 2). The device may have a first bootloader and a second bootloader. The first and second bootloaders may also be referred to herein respectively as a primary bootloader and a secondary bootloader. Each of the bootloaders may be configured to use a respective key in performing a verification. The first bootloader may be configured to use a first key (e.g., a key provided by the software provider), and the second bootloader may be configured to use a second key (e.g., a key provided by a user of the device). In some embodiments, each of the first and second bootloaders may be configured to use both the first and second key. The software instructions may be encrypted using two keys corresponding to the first key and the second key. In some embodiments, the instructions may be digitally signed using two keys. For example, the first and second keys may be public keys and the software instructions may be digitally signed using first and second private keys corresponding to the first and second public keys. A software provider system may sign the instructions using the first private key and a user system may sign the instructions using the second private key.

Process 600 begins at block 602, where the device uses the first bootloader to verify the instructions using the first key. The device may load the first bootloader from memory of the device (e.g., ROM or flash). The first bootloader may be configured to verify the instructions using a first key (e.g., a first public key, or a first symmetric key). The first bootloader may be configured to use the first key to verify a first digital signature included in the instructions. In this example, the first bootloader may use the key to verify the first digital signature by: (1) decrypting encrypted data of the first digital signature using the first key to obtain a decryption of the encrypted data; and (2) verifying the first digital signature based on the decryption. The first bootloader may verify the first digital signature based on the decryption by determining whether the decryption matches an expected output of the decryption. For example, the encrypted data may be an encryption of a hashing of a set of data. In this example, the first bootloader may determine whether the decryption of the encrypted data matches the hashing of the set of data to verify the digital signature. If the decryption matches the hashing of the set of data, then the first bootloader may determine that the first digital signature as valid. If the decryption does not match the hashing of the set of data, then the first bootloader may determine that the first digital signature is invalid.

Next, process 600 proceeds to block 604, where the device determines whether the instructions were verified at block 602. If verification of the instructions failed at block 602, then process 600 proceeds to block 612, where the device prevents execution of the instructions. At block 612, the device may stop execution of the instructions. Thus, the device may not perform any key revocation or software update. The device may continue with a previous version of the software and continue using a current key for verification.

If the device verified the instructions at block 602 (e.g., by determining that a first digital signature is valid), then process 600 proceeds to block 606, where the device uses a second bootloader to verify the instructions using the second key. The device may load the second bootloader from memory of the device (e.g., ROM or flash). The second bootloader may be configured to verify the instructions using a second key (e.g., a second public key, or a second symmetric key). The second bootloader may be configured to use the second key to verify a second digital signature included in the instructions. In this example, the second bootloader may use the key to verify the second digital signature by: (1) decrypting encrypted data of the second digital signature using the second key to obtain a decryption of the encrypted data; and (2) verifying the second digital signature based on the decryption. The second bootloader may verify the second digital signature based on the decryption by determining whether the decryption matches an expected output of the decryption. For example, the encrypted data may be an encryption of a hashing of a set of data. In this example, the second bootloader may determine whether the decryption of the encrypted data matches the hashing of the set of data to verify the digital signature. If the decryption matches the hashing of the set of data, then the second bootloader may determine that the second digital signature as valid. If the decryption does not match the hashing of the set of data, then the second bootloader may determine that the second digital signature is invalid.

Next, process 600 proceeds to block 608, where the device determines whether the instructions were verified at block 606. If verification of the instructions failed at block 606, then process 600 proceeds to block 612, where the device prevents execution of the instructions as described above. If the instructions are verified at block 606, then process 600 proceeds to block 610, where the device permits execution of the instructions. For example, the instructions may be executed by the second bootloader or by operational software of the device. The instructions may be executed as described at blocks 506 and 508 of process 500 described herein with reference to FIG. 5.

Figure 7:
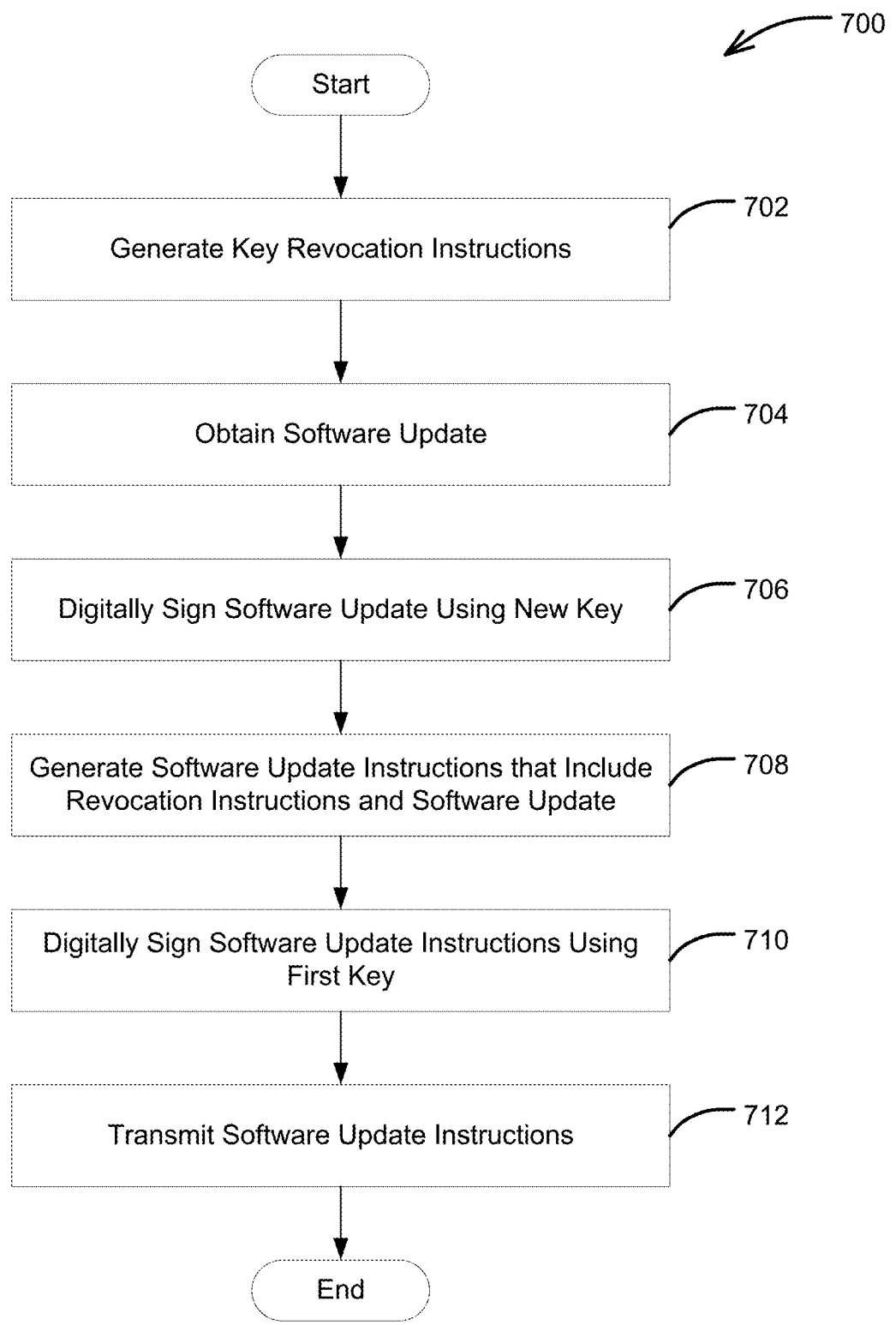
FIG. 7 illustrates an example process for a system to initiate key revocation on a device, according to some embodiments of the technology described herein.

FIG. 7 illustrates an example process 700 for a system to perform key revocation on a device, according to some embodiments of the technology described herein. In some embodiments, process 700 may be performed by software provider system 106 to revoke a key on device 102 as described herein with reference to FIG. 1.

Process 700 begins at block 702, where the system obtains generates key revocation instructions. The key revocation instructions, when executed by the device, may cause the device to revoke use of a first key and replace it with a new key as described at blocks 506-508 of process 500 described herein with reference to FIG. 5. For example, the system may generate a file including code encoding the key revocation instructions.

Next, process 700 proceeds to block 704, where the system obtains a software update. The system update may be an updated software image for software installed on the device. In some embodiments, the system may be configured to obtain the software image by compiling source code into an executable software image. For example, the system may compile source code into a binary file that can be loaded and executed by the device. In some embodiments, the system may be configured to obtain the software image by receiving the software image from another system. For example, the software image may have been generated by compiling source code on another system and then transmitted to the system performing process 700.

Next, process 700 proceeds to block 706, where the system digitally signs the software update using a new key. The new key may correspond to a new key for use by the device in place of the first key after revocation is performed. In some embodiments, the new key may be a new private key corresponding to a new public key to be used on the device. In some embodiments, the new key may be a new symmetric key which is also to be used on the device. The system may be configured to digitally sign the software update by generating a digital signature to be included with the software update. The system may be configured to generate the digital signature by: (1) obtaining a set of data; and (2) encrypting the set of data using the new key to obtain an encrypted set of data as the digital signature. In some embodiments, the system may be configured to obtain the set of data by hashing data (e.g., textual data) to obtain the set of data. The system may encrypt the hashed set of data using the new key. By digitally signing the software update using the new key, the software update may be verified by the device using a corresponding new key of the device after execution of the revocation instructions.

Next, process 700 proceeds to block 708, where the system generates software update instructions that include the revocation instructions and the software update. In some embodiments, the system may be configured to generate one or more files including the software update and the revocation instructions. For example, the system may generate a file including the software update (e.g., a software image), and a file including the revocation instructions. The system may store the two files in a single data package as the software update instructions. An example set of software update instructions that may be generated by the system is described herein with reference to FIG. 3.

Next, process 700 proceeds to block 710, where the system digitally signs the software update instructions using a first key that corresponds to a key that the device is currently configured to use for verification. The system may digitally sign the software update instructions by generating a digital signature that is included with the software update instructions. Techniques of generating a digital signature using a key are described herein. The device may be configured to verify the software update instructions using the key corresponding to the first key. For example, the device may verify the software update instructions using a public key corresponding to the first key. In another example, the first key may be a symmetric key, and the device may verify the software update instructions using the first symmetric key.

Next, process 700 proceeds to block 712, where the system transmits the software update instructions. In some embodiments, the system may be configured to transmit the software update instructions to a user system. The user system may digitally sign the software update instructions. In some embodiments, the user system may verify a digital signature of the system performing process 700 and, if the user system determines that the digital signature is valid, the user system may digitally sign the software update instructions by generating its own digital signature. The user system may then transmit the software update instructions to a host system (e.g., host system 104) for transmission to the device. In some embodiments, the user system may transmit the software update instructions to a host system without digitally signing the software update instructions. In such embodiments, the software update instructions may be signed by a single entity (e.g., the system performing process 700). The device may verify the software update instructions by verifying both digital signatures included in the software update instructions. In some embodiments, the system performing process 700 may be configured to transmit the software update instructions to the host system without transmitting them to a user system. The device may verify the software update instructions by verifying the digital signature of the system included in the software update instructions. Transmission of the software update instructions to the device may cause the device to perform process 500 described herein with reference to FIG. 5. The device may revoke use of a key and initiate use of another key in place of the revoked key.

In some embodiments, the system may be configured to transmit the software update instructions including the key revocation instructions without receiving any request generated by the device. For example, the system may transmit the software update instructions without participating in any communication protocol with the device. As described herein with reference to FIG. 4, the device may receive the instructions (e.g., through a host system) without requesting the instructions. This may eliminate the opportunity for an adversary to intercept any such request and/or send its own key to the device.

Figure 8:
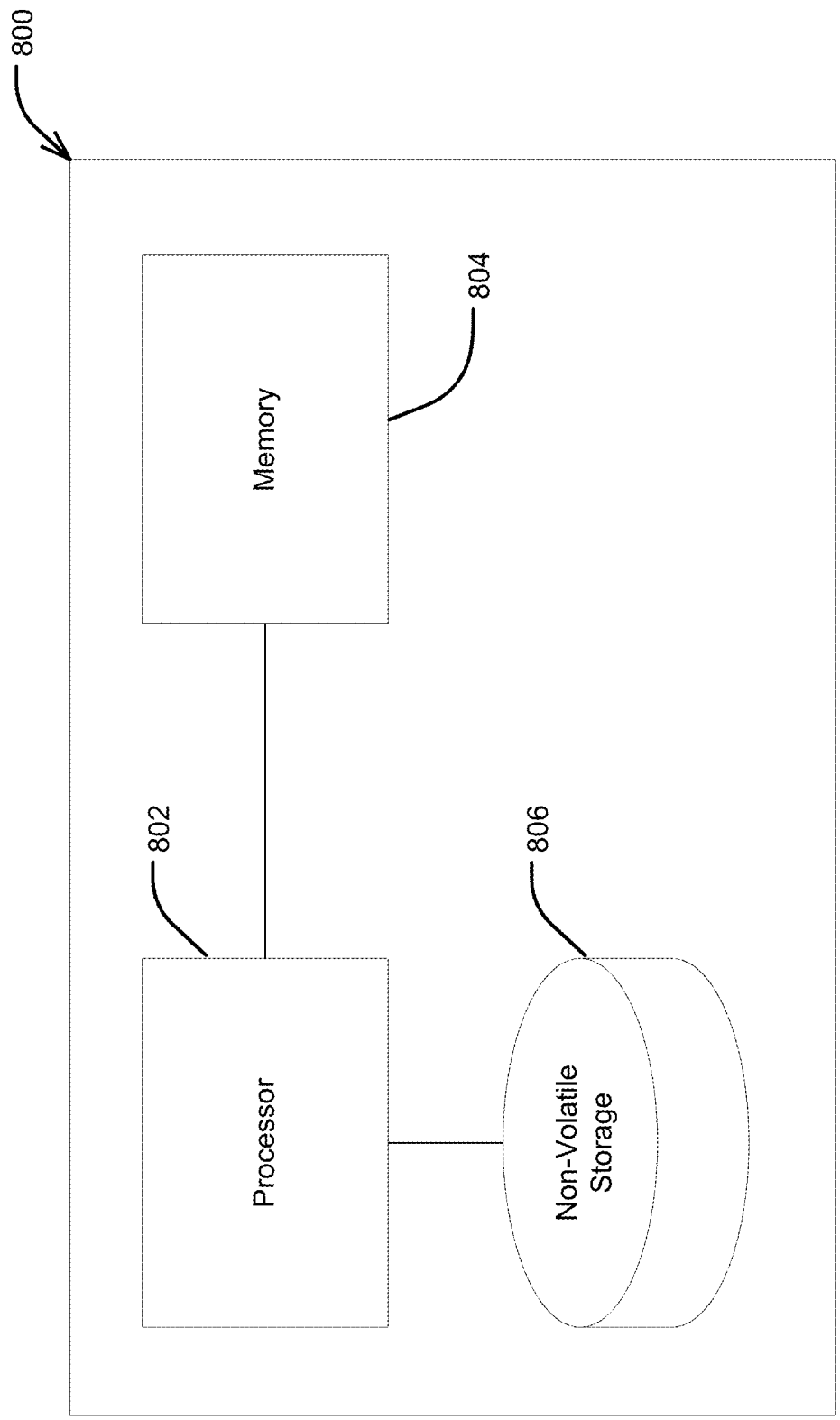
FIG. 8 illustrates an example computer system which may be used to implement some embodiments of the technology described herein.

FIG. 8 shows a block diagram of an example computer system 800 that may be used to implement embodiments of the technology described herein. The computing device 800 may include one or more computer hardware processors 802 and non-transitory computer-readable storage media (e.g., memory 804 and one or more non-volatile storage devices 806). The processor(s) 802 may control writing data to and reading data from (1) the memory 804; and (2) the non-volatile storage device(s) 806. To perform any of the functionality described herein, the processor(s) 802 may execute one or more processor-executable instructions stored in one or more non-transitory computer-readable storage media (e.g., the memory 804), which may serve as non-transitory computer-readable storage media storing processor-executable instructions for execution by the processor(s) 802.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

What is claimed is:

1. A method for performing a key revocation on an edge device, the method comprising:
   generating, by a processor, a first software provider signature using a first software provider key corresponding to a first device key stored on the edge device;
   generating, by the processor, a second software provider signature using a second software provider key corresponding to a third device key that is to be used in place of the first device key after revocation;
   transmitting, by the processor without connectivity to the edge device, to a host system within a local network of the edge device, instructions for updating software installed on the edge device, wherein:
      the instructions for updating the software include:
         instructions for revocation of the first device key and initiating use of the third device key in place of the first device key; and
         a software image,
      the instructions for updating the software are signed with both the first software provider signature generated by the software provider system and a user signature generated by a user system separate from the software provider system using a user key corresponding to a second device key stored on the edge device, and the software image is signed with the second software provider signature;
   receiving, by the host system, the instructions from the processor;
   transmitting, by the host system to the edge device, the instructions;
   receiving, by the edge device from the host system, the instructions;
   performing, by the edge device, internal to the edge device and exclusive of communications to the host system, a verification operation of the instructions to verify the first software provider signature and the user signature using the first device key and the second device key stored on the edge device, the performing of the verification operation comprising:
      verifying the first software provider signature of the instructions using the first device key corresponding to the first software provider key; and
      verifying the user signature of the instructions using the second device key corresponding to the user key; and
   after verifying both the first software provider signature and the user signature, executing by the edge device, internal to the device and exclusive of communications to the host system, the instructions, wherein execution of the instructions causes the edge device to:
      revoke use of the first device key; and
      initiate use of the third device key in place of the first device key.

2. The method of claim 1, wherein the device does not have Internet connectivity.

3. The method of claim 1, wherein the device cannot communicate with a third party verification authority.

4. The method of claim 2, wherein the device is an edge device.

5. The method of claim 1, wherein performing the verification operation of the instructions to verify the first software provider signature and the user signature using the first device key and the second device key stored on the device comprises:
   verifying, using a first bootloader of the device, the instructions using the first device key; and
   verifying, using a second bootloader of the device, the instructions using the second device key.

6. The method of claim 5, wherein executing the instructions comprises executing the instructions using the second bootloader.

7. The method of claim 1, wherein the third device key is stored in the device prior to receipt of the instructions for revoking the first device key.

8. The method of claim 1, wherein revocation of a given device key can be performed up to a predetermined number of times.

9. The method of claim 1, further comprising:
   receiving, from the host system within the local network of the device, a second set of instructions for updating software installed on the device, wherein the second set of instructions includes instructions for revocation of the second device key; and
   executing the second set of instructions, wherein execution of the second set of instructions causes the device to:
      revoke use of the second device key; and
      initiate use of a fourth device key in place of the second device key.

10. A system for performing key revocation on an edge device, the system comprising:

a wireless communication circuit without having connectivity to the edge device to a host system within a local network, the edge device having a first device key corresponding to a first software provider key generated by the system and a second device key corresponding to a user key generated by a user system separate from the system; and a processor configured to:
  generate a first software provider signature using the first software provider key generated by the system and corresponding to the first device key;
  generate a second software provider signature using a second software provider key corresponding to a third device key that is to be used in place of the first device key after revocation;
  transmit, using the wireless communication circuit to the host device within the local network of the edge device, instructions for updating software installed on the edge device, wherein:
    the instructions for updating the software include a software image,
    the instructions for updating the software are signed with:
      the first software provider signature generated using the first software provider key generated by the system; and
      a user signature generated by the user system separate from the system using the user key corresponding to the second device key, and
    the software image is signed with the second software provider signature;
  the host device, configured to receive the instructions from the wireless communication circuit; and
  the edge device, configured to wirelessly receive the instructions from the host device, perform, internal to the edge device and exclusive of communications to the host system, a verification operation of the instructions to verify the first software provider signature and the user signature, and execute, internal to the edge device and exclusive of communications to the host system, the instructions to revoke use of the first device key of the edge device and initiate use of the second device key in place of the first device key.

11. The system of claim 10, wherein the processor is further configured to sign the instructions using the first software provider key generated by the system.

12. The system of claim 10, wherein the processor is further configured to sign the software image using the second software provider key.

13. The system of claim 10, wherein the processor is further configured to generate the instructions by including, in the instructions, key revocation instructions and the software image.

14. The method of claim 1, wherein:
  the first software provider key is a first private key generated by the software provider system and the first device key is a public key corresponding to the first private key generated by the software provider system; and
  the second software provider key is a second private key generated by the software provider system and the third device key is a public key corresponding to the second private key generated by the software provider system.

15. The method of claim 1, wherein:
  the user key of the user system is a private key of the user system; and
  the second device key is a public key corresponding to the private key of the user system.

16. The method of claim 1, further comprising, after executing the instructions, verifying the second software provider signature of the software image using the third key.

* * * * *